US010121055B1

United States Patent
Savvides et al.

(10) Patent No.: US 10,121,055 B1
(45) Date of Patent: Nov. 6, 2018

(54) METHOD AND SYSTEM FOR FACIAL LANDMARK LOCALIZATION

(71) Applicant: Carnegie Mellon University, Pittsburgh, PA (US)

(72) Inventors: Marios Savvides, Wexford, PA (US); Keshav Thirumalai Seshadri, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 19 days.

(21) Appl. No.: 15/259,143

(22) Filed: Sep. 8, 2016

Related U.S. Application Data

(60) Provisional application No. 62/283,690, filed on Sep. 8, 2015.

(51) Int. Cl.
G06K 9/00 (2006.01)
G06K 9/62 (2006.01)
G06K 9/32 (2006.01)
G06K 9/66 (2006.01)

(52) U.S. Cl.
CPC ....... G06K 9/00248 (2013.01); G06K 9/3216 (2013.01); G06K 9/6277 (2013.01); G06K 9/66 (2013.01); *G06K 2009/3225* (2013.01)

(58) Field of Classification Search
None
See application file for complete search history.

(56) References Cited

U.S. PATENT DOCUMENTS

| | | | |
|---|---|---|---|
| 9,361,510 B2* | 6/2016 | Yao | G06K 9/00261 |
| 9,633,250 B2* | 4/2017 | Tuzel | G06K 9/00281 |
| 2015/0186748 A1* | 7/2015 | Cootes | G06K 9/6282 |
| | | | 382/159 |
| 2015/0243031 A1* | 8/2015 | Narasimha | G06T 7/0042 |
| | | | 382/103 |

OTHER PUBLICATIONS

Zhang et al., "Hierarchical facial landmark localization via cascaded random binary patterns", Pattern Recognition 48 (2015) 1277-1288, available online Sep. 18, 2014.*
Yan et al., "Learn to combine multiple hypotheses for accurate face alignment", ICCVW 2013, conference held on Dec. 2-8, 2013.*
Deng et al., "Low rank driven robust facial landmark regression", Neurocomputing 151 (2015) 196-206, available online Oct. 7, 2014.*
Cui et al., "Robust facial landmark localization using classified random ferns and pose-based initialization", Signal Processing 110 (2015) 46-53.*

(Continued)

*Primary Examiner* — Soo Park

(57) ABSTRACT

This invention describes methods and systems for the automated facial landmark localization. Our approach proceeds from sparse to dense landmarking steps using a set of models to best account for the shape and texture variation manifested by facial landmarks across pose and expression. We also describe the use of an $l_1$-regularized least squares approach that we incorporate into our shape model, which is an improvement over the shape model used by several prior Active Shape Model (ASM) based facial landmark localization algorithms.

19 Claims, 17 Drawing Sheets

(56) References Cited

OTHER PUBLICATIONS

Zhang et al., "Adaptive facial point detection and emotion recognition for a humanoid robot", Computer Vision and Image Understanding 140 (2015) 93-114.*

Asthana et al., "Fully automatic pose-invariant face recognition via 3D pose normalization", 2011 IEEE International Conference on Computer Vision.*

Abiantun, et al., An Anallysis of Facial Shape and Texture for Recognition: A Large Scale Evaluation on FRGC ver2.0, (C) 2010 IEEE.

Luu, et al., Contourlet Appearance Model for Facial Age Estimation, (C) 2011, IEEE.

Seshadri, et al., An Analysis of the Sensitivity of Active Shape Models to Initialization When Applied to Automatic Facial Landmarking, IEEE Trans. on Info. Forensics and Sec. (TIFS), 7(4): 1255-1269, Aug. 2012.

Hoang, et al., Beard and Mustache Segmentation Using Sparse Classifiers on Self-quotient Images, (C) 2012, IEEE, ICIP 2012.

Hoang, et al., A Facial Aging Approach to Identification of Identical Twins, (C) 2012, IEEE.

* cited by examiner

Algorithm 1 Overview of Our Appoach
---
Input: Image, face detection bounding box results, pre-trained pose (yaw) and expression specific global shape and local texture models Output: Final landmark coordinates and occlusion/misalignment label for each landmark for $m = 1, ..., M$
do
    Detect and retain top seed landmark candidates for pose m.
end for for $m = 1, ..., M$ do Obtain and score shapes $S^{j,m}$ $(j = 1, ..., J_m)$, generated by aligning specific mean shape $\tilde{S}_m$ (with dense set of landmarks) with combinations of pose specific seed landmark candidates taken 2 at a time, using equations (4) - (6).

Retain highest scoring pose specific initial shape $S^m_{init}$ using equations (10) and (11).

end for

Identify tpo scoring M' pose specific initial shapes from among Al pose specific initial shapes for $m = 1, ..., M'$ do Refine shapes $S^{m'}_{init}$ to obtain $S^{m'}_{ref}$ using pose and expression specific models.

end for

Retain highest scoring pose refined shape $S_{fin}$ from among the refined shapes $S^{m'}_{ref}$ $(m = 1, ..., M')$ using equations (18) and (20).

Output final set of landmarks sfin and their occlusion/misalignment labels.

FIG. 1A (a) (b) (a) (b)

METHOD AND SYSTEM FOR FACIAL LANDMARK LOCALIZATION

RELATED APPLICATIONS

This application claims the benefit of U.S. Provisional Patent Application Ser. No. 62/283,690, filed Sep. 8, 2015.

GOVERNMENT RIGHTS

This invention was made, in part, with government support under Grant Number DTFH61-14-C-00006 awarded by Federal Highway Administration's (FHWA) Exploratory Advanced Research Program. The United States government has certain rights in this invention.

FIELD OF THE INVENTION

This invention relates to the field of processing of facial images, and in particular, to methods and systems for localization of facial landmarks in images of faces. More particularly, this invention relates to automated methods of performing facial landmark localization.

BACKGROUND OF THE INVENTION

The automatic localization of facial landmarks (also referred to as facial landmarking or facial alignment), such as the corners of the eyes, the tip of the nose, the tip of the chin, and the corners of the mouth, is a key pre-processing step that can aid in performing facial recognition, generation of 3D facial models, expression analysis, superresolution of faces, pose estimation, gender and ethnicity classification, age estimation, facial hair segmentation, and a variety of other facial analytic tasks. With the strides made in all of these areas over the past few years there has been a shift towards harnessing local information in regions around key facial landmarks, apart from global information that can be obtained after the use of a face detector that provides a bounding box around a face in an image. This has, in turn, motivated the need for extremely precise automatic facial landmarking methods and systems that can generalize and adapt well enough to be able to handle variations in pose, illumination, expression, levels of occlusion, and image resolution in unseen test images. It is also desirable that such methods be able to be trained on a limited amount of training data, as providing manually annotated ground truths that are necessary to train these systems is an arduous task.

Facial landmark localization has been well researched over the past few years and a variety of different techniques have been proposed to deal with the problem. Traditionally facial landmarking has been carried out using deformable template (parametric) based models, such as Active Shape Models (ASMs) and Active Appearance Models (AAMs). Both ASMs and AAMs build shape models (also referred to as Point Distribution Models (PDMs)), that model the shape of a typical face that is represented by a set of constituent landmarks, and texture models of what the region enclosed by these landmarks looks like. The difference between the two is that ASMs build local texture models of what small 1D or 2D regions around each of landmarks look like, while AAMs build global texture models of the entire convex hull bounded by the landmarks. ASMs belong to a class of methods that can be broadly referred to as Constrained Local Models (CLMs). CLMs build local models of texture around landmarks (sometimes referred to as patch experts) and allow landmarks to drift into the locations that optimize a cost function by updating and manipulating a set of shape coefficients to generate a final set of landmarks that are in accordance with the "rules" for what a typical face looks like. Several improvements have been made to ASMs over the years that have mainly focused on developing better local texture models, however, they still remain susceptible to the problems of facial occlusion and local minima, and are very dependent on good initialization being provided. Thus, several efforts have been made to develop alternative shape regularization techniques to better cope with pose variation and partial occlusion of the face.

Over the past few years there has been a dramatic increase in literature dealing with the automatic landmarking of non-frontal faces. Everingham et al. developed an algorithm that used a generative model of facial feature positions (modeled jointly using a mixture of Gaussian trees) and a discriminative model of feature appearance (modeled using a variant of AdaBoost and "Haar-like" image features) to localize a set of 9 facial landmarks in videos with faces exhibiting slight pose variation. Dantone et al. used conditional regression forests to learn the relations between facial image patches and the location of feature points conditioned on global facial pose. Their method also localized a sparse set of 10 landmarks in real-time and achieved accurate results when trained and tested on images from the Labeled Faces in the Wild (LFW) database. Belhumeur et al. proposed a novel approach to localizing facial parts by combining the output of local detectors with a consensus of nonparametric global models for part locations computed using training set exemplars, that served as a surrogate for shape regularization, in a Bayesian framework.

Their approach was able to localize a set of 29 facial landmarks on faces that exhibited a wider range of occlusion, pose, and expression variation than many previous approaches.

In a recent work, Zhu and Ramanan proposed a framework that built on the previously developed idea of using mixtures of Deformable Part Models (DPMs) for object detection to simultaneously detect faces, localize a dense set of landmarks, and provide a course estimate of facial pose (yaw) in challenging images. Their approach used a mixture of trees with a shared pool of parts to model each facial landmark. Global mixtures were used to capture changes in facial shapes across pose and the tree-structured models were optimized quickly and effectively using dynamic programming. Their approach is quite effective at localizing landmarks across all views on clean (un-occluded) images that do not exhibit excessive occlusion levels. However, their approach is not extremely accurate when it comes to landmarking occluded faces or faces that exhibit large in-plane rotation. Asthana et al. developed a discriminative regression based approach for the CLM framework that they referred to as Discriminative Response Map Fitting (DRMF). DRMF represents the response maps around landmarks using a small set of parameters and uses regression techniques to learn functions to obtain shape parameter updates from the response maps.

All of the previously mentioned facial alignment algorithms are capable of providing accurate fitting results on some challenging images but lack some features provided by the method and system of the present invention. Some of the previously mentioned approaches only localize a sparse set of landmarks which is unsuitable for many real-world applications, such as expression analysis or the building of 3D facial models, that require a slightly denser set of landmarks to establish point correspondences. Also, none of the approaches demonstrate the capability of handling yaw variation in excess of +45° and are thus incapable of automatically landmarking profile faces. Finally, even though a few of the previously mentioned approaches demonstrate slight tolerance to partially occluded faces, none of them provide a score or label that can be used to determine which landmarks are potentially misaligned or occluded. It would be desirable to address all of these issues in a single framework.

The task of automatically landmarking low resolution images that also exhibit pose variation and partial occlusion of the face must also be addressed. There has been some prior work on facial alignment of frontal low resolution facial images. Liu et al. built a multi-resolution AAM at various scales of facial size and used the most appropriate model (with a model resolution slightly higher than the facial resolution) to fit low resolution faces (of varying resolution) in a few video sequences. Dedeoglu et al. proposed a Resolution-Aware Formulation (RAF) that modified the original AAM fitting criterion in order to better fit low resolution images and used their method to fit 180 frames of a video sequence. Qu et al. extended a traditional CLM to a multi-resolution model consisting of a 4-level patch pyramid and also used various feature descriptors to construct the patch experts. They compared their approach (using various feature descriptors) against a baseline CLM approach on downsampled 35×35, 25×25, and 15×15 faces from a few databases, such as the MPIE database, and demonstrated acceptable fitting accuracies on the low resolution faces. None of the previously mentioned works, however, investigated the challenges posed to the fitting process by the presence of facial pose variation in low resolution images.

Because facial shape and the local texture around the landmarks that constitute them vary in a nonlinear fashion with facial pose and expressions, it is necessary to build not one, but multiple models that can best span and account for these variations. Additionally, occlusions can occur anywhere on the face and vary significantly in textural appearance (e.g. sunglasses, hats, human hair, hands, cellular phones, scarves, other faces, etc.). Thus, the building of models to account for them based on where they could typically lie (a shape based modeling approach to handling occlusions), is an idea that does not generalize well to real-world images. Many existing facial alignment algorithms also rely heavily on consistent facial detection results, something that is seldom guaranteed when dealing with real-world images data as facial bounding box results produced by the same detector vary in size and location even for a similar set of images and do not always account for in-plane rotation (roll) of the face.

SUMMARY OF THE INVENTION

The present invention describes methods and systems for automated localization of facial landmarks. The novel approach involves: (1) the formulation of a unified framework for dense (more than just the 10-30 facial landmarks that many existing algorithms localize) facial landmark localization to jointly deal with the problems posed by facial pose (for illustrative purposes, focus is placed on the out-of-plane rotation of the face, referred to as yaw, and the in-plane rotation 'of the face, referred to as roll, and not on the nodding of the head, referred to as pitch) variation (with the full range of yaw variation from −90° to +900 being handled), varying facial expressions, and partial occlusion of the face; (2) research into the area of landmarking low resolution facial images that also exhibit pose variation and partial occlusion and a demonstration of the suitability of our approach to this problem; (3) a novel method to constrain shape coefficients to avoid the generation of implausible facial shapes; and (4) a benchmarking of the approach of the present invention against state-of-the-art approaches on a few challenging datasets.

BRIEF DESCRIPTION OF THE DRAWINGS

FIG. 1A is an algorithmic representation of the process.

FIG. 9A shows images from the MPIE occluded dataset, FIG. 9B shows images from the LFPW dataset, and FIG. 9C shows images from the COFW dataset. In all facial images with landmarks overlaid on them, yellow dots are used to indicate the locations of facial landmarks, blue line segments indicate that the landmark at their center is accurately localized, and red line segments indicate that the landmark at their center is misaligned or potentially occluded.

FIG. 11A shows the MPIE dataset, FIG. 11B shows the MPIE occluded dataset, FIG. 11C shows the LFPW dataset and FIG. 11D shows the COFW dataset.

FIG. 12A shows a 10 point scheme for 10×10 profile faces, FIG. 12 B shows a 14 point scheme for 10×10 frontal faces, FIG. 12C shows a 21 point scheme for 20×20 profile faces, and FIG. 12D shows a 36 point scheme for 20×20 frontal faces. The facial images in the figures are from the MPIE database.

FIG. 13A shows the CED curve for the MPIE dataset and FIG. 13B shows the CED curve for the MP1E occluded dataset.

FIG. 14A shows results using the MPIE dataset and FIG. 14B shows results using the MPIE occluded dataset. In all facial images with landmarks overlaid on them, yellow dots are used to indicate the locations of facial landmarks, blue line segments/dots indicate that the landmark at their center/the landmark itself is accurately localized, and red line segments/dots indicate that the landmark at their center/the landmark itself is misaligned or potentially occluded. In FIGS. 14A and 14B, the columns from left to right correspond to the facial resolutions 10×10, 20×20, 40×40, 80×80, and 160×160 respectively.

DETAILED DESCRIPTION OF THE INVENTION

The term "image sensor" as used herein shall mean the source of a digital still or video image. In addition to traditional still and video cameras, for purposes herein a image sensor could include, for example, a storage medium having a video file stored thereon.

The term "microprocessor" as used herein shall mean an integrated circuit that contains all the functions for processing. This includes, for example, graphics processing units (GPUs), field-programmable gate array (FPGA), a traditional computer processor, or any other means of executing program instructions or otherwise processing data.

The term "image" as used herein shall mean a physical image, a physical data file, stored on a storage media or stored on online storage, containing one or more images in any format, an image in any format obtained directly from an image sensor, such as a camera, in real time or otherwise, a scanned image, a single image or a video containing a series of image frames.

Figure 1:
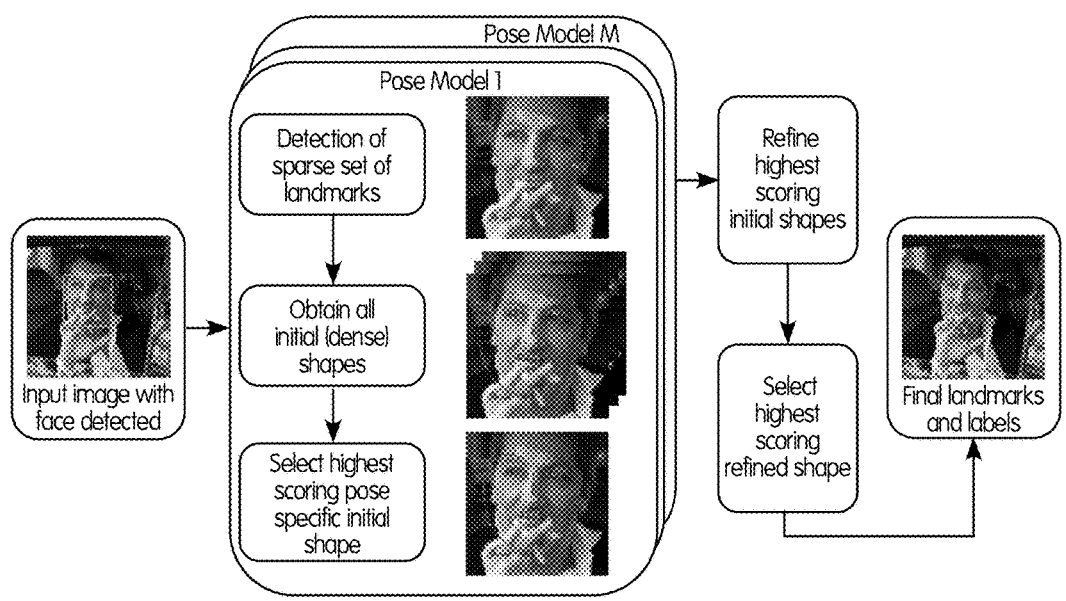
FIG. 1 is a schematic drawing showing an overview of the methods of the invention showing how each stage in the process works. In all facial images with landmarks overlaid on them, yellow dots are used to indicate the locations of facial landmarks, blue line segments indicate that the landmark at their center is accurately localized, and red line segments indicate that the landmark at their center is misaligned or potentially occluded.

FIG. 1 provides an overview of the approach of the present invention. After the face is detected and a standard sized crop of the face is generated, a sparse landmarking step is carried out, in which a sliding window based approach is used to search for only a few key facial landmarks (that are referred to as seed landmarks), such as the centers of the eyes, tip of the nose, tip of the chin, and the corners of the lips, using pose specific local detectors. In the next step, we exhaustively evaluate denser pose specific shapes that are obtained by taking all combinations of the seed landmarks (two a time) and using a similarity transformation to align a pose-specific mean shape of the full (dense) set of landmarks with them. These denser shapes are evaluated using a goodness of fit criteria based on whether each landmark in the dense set of landmarks is an inlier, i.e., potentially resembling well aligned patches extracted from around that landmark at a specific yaw angle at the training stage, or an outlier, i.e., not resembling well aligned patches extracted from around that landmark at a specific yaw angle at the training stage and thus misaligned or possibly occluded. We are now able to retain a single (highest scoring) dense landmark based shape for each of the M discrete facial yaw angles and transition from a step in which we located a sparse set of facial landmarks to a dense set of landmarks that best approximate the underlying textural information. The last step now involves refining the top scoring shapes from among the M shapes and a ranking of the results to determine a single set of landmarks that are best aligned with the facial image. For carrying out a key part of this stage we describe a novel $l_1$-regularized least squares approach to regularize the deformed facial shapes using a dictionary of shapes that is able to generate a more accurate regularized facial shape than the corresponding version that is produced by ASMs. The algorithm, shown in FIG. 1A, summarizes the entire process and details on each of the stages in the algorithm follow.

Figure 2A:
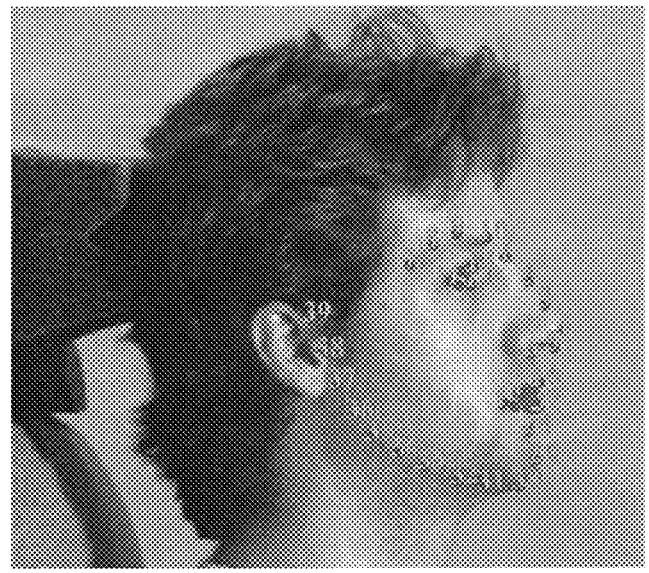
FIG. 2A shows MPIE landmarking (markup) schemes for profile faces (39 facial landmarks)
Figure 2B:
FIG. 2B shows frontal faces (68 facial landmarks). The facial images in the figures are from the MPIE database.

As previously mentioned, the initial step in the alignment process is the detection of a sparse set of key facial landmarks that we refer to as seed landmarks. We train our models using a subset of images from the CMU Multi-PIE (MPIE) database with manual annotations available for images using a 68 point landmarking scheme for frontal faces (the definition of frontal in our context includes faces with a yaw angle between −45° to +450) and a 39 point landmarking scheme for non-frontal (faces with a yaw angle in excess of 45°) faces. These landmarking schemes are shown in FIG. 2A_B. For frontal faces, 8 landmarks are initially searched for. These include the centers of the two eyes, tip of the nose, corners of the mouth, tip of the chin, and two opposite points on the facial boundary close to the ears (landmarks 2 and 16 in frontal faces, as shown in FIG. 2B, and landmark 38 in profile faces, as shown in FIG. 2A.). The same set of seed landmarks is searched for in profile faces (faces that exhibit a yaw angle in excess of 45°), however their number is now only 5, since one side of the face is only partially visible or not visible at all.

During the training stage, we construct landmark, expression, and pose specific local appearance (texture) models for each landmark, including the seed landmarks. A crop of a fixed size is generated around the ground truth landmark locations and resized to a fixed size. For each landmark, a classifier is built to distinguish the local texture around the landmark in a particular feature space from the local texture of a different landmark or an occlusion. This is carried out by extracting features for positive samples, at the exact locations of the ground truth coordinates and from a small region around these locations to add variation to the training set and account for a small amount of variance in human labeling, and negative samples (local texture descriptors for incorrect locations for a landmark) at various random locations close to and far away from the ground truths. We also construct separate linear subspaces (using Principal Component Analysis (PCA) as a dimensionality reduction technique) using the positive and negative samples that are used in the next stage of our facial alignment pipeline (the dense landmark alignment stage).

Figure 3:
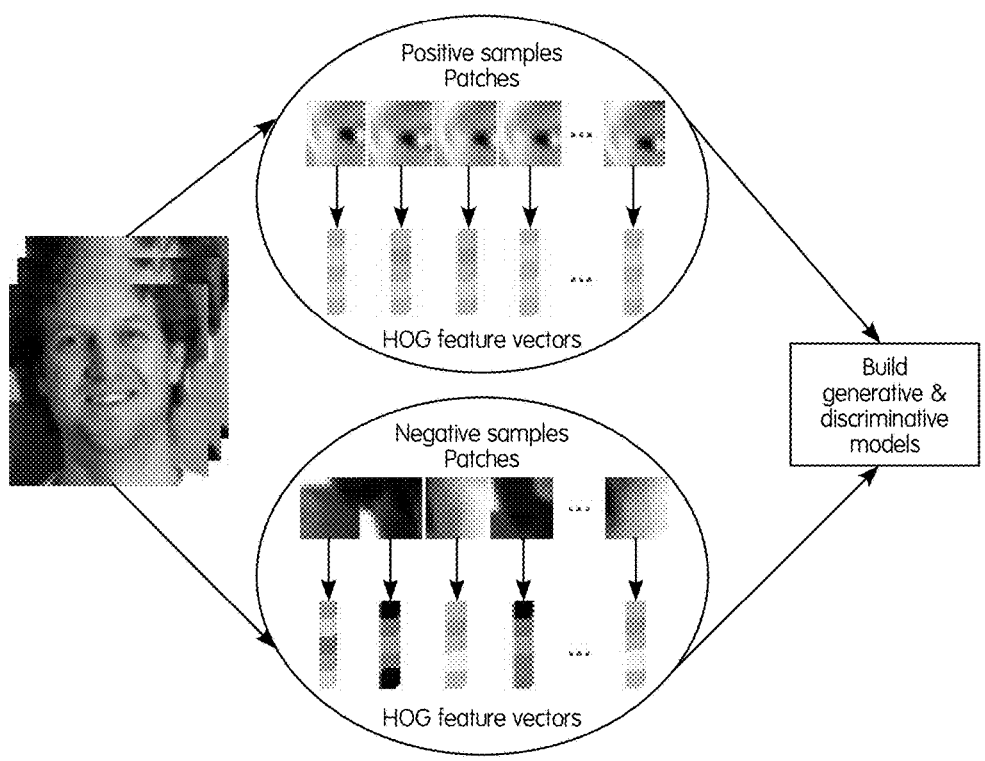
FIG. 3 shows the process by which local texture classifiers and subspaces are constructed for a specific landmark (mouth corner marked with a green dot) and pose using a training set of various annotated images.

Histogram of Oriented Gradients (HOG) are used as feature descriptors as they have been proven to be quite discriminative in prior facial alignment algorithms and are tolerant to illumination variation. We use a spatial bin size of $\omega/3$, where w is the width (=height) of the square patch around a landmark and 9 orientation bins evenly spaced from 0° to 180°. Thus, since our feature extraction window has 9 cells that are grouped into blocks containing 4 cells each, normalized for each block, and finally concatenated, our HOG feature vector is of the same length of 144 for all landmarks. FIG. 3 illustrates how our local appearance models and subspaces are constructed for each landmark while section 9.5 provides exact details on how many such models are built and the parameters used in their construction. It is to be noted that M=10 for our purposes. We also build a further set of 6 models for frontal yaw angles with open mouth expressions (scream and surprise), but do not use them at this stage or our subsequent dense landmarking stage to ensure a higher a fitting speed. Since the aim of the sparse and dense shape alignment steps is to provide an approximate shape initialization for each yaw model, we found that this could be achieved using just the 10 closed mouth (neutral and smiling expressions) models for each pose specific model and that only our final refinement step demanded the use of expression specific models to obtain high fitting accuracy.

Figure 4:
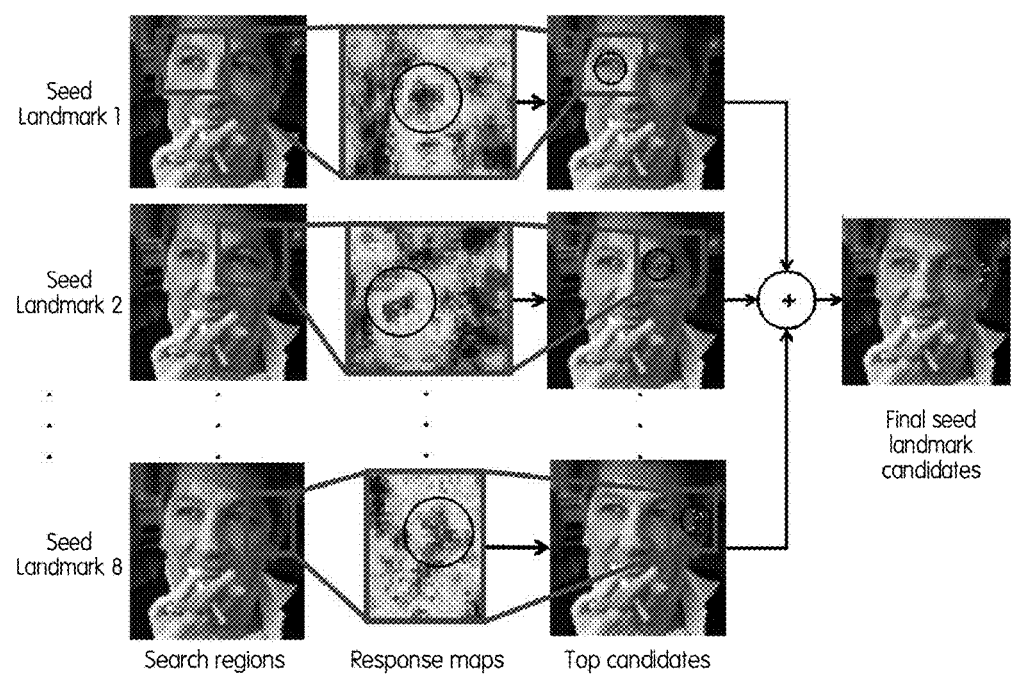
FIG. 4 shows the process by which seed landmark candidates are retained when fitting a test image. For each of the seed landmarks that can be detected for a particular yaw angle range, all pixels within the search regions, shown in (a), are evaluated using our local texture classifiers to produce response maps, shown in (b), from which the top scoring candidates can be retained, as shown in (c). The final set of candidates for all seed landmarks are shown in (d). The same process is also repeated for different in-plane rotation angles and the resulting candidates are clustered to produce a final set of candidates for each of the seed landmarks. The process is shown only for one of the pose models (for a yaw angle of 0° to +15°), but is repeated to retain seed landmark candidates specific to each pose model.

Our local texture classifiers are constructed using an ensemble of classifiers in a Real AdaBoost framework. It must be noted that any choice of classifier, such as Support Vector Machines (SVMs), random forests, or random ferns, would be applicable in this setting. However for an illustrative embodiment, the well-known Real AdaBoost framework was chosen due to the minimal parameters that need to be determined for such a classifier (only the number of boosting rounds or number of classifiers in the ensemble need to be specified) and its resistance to overfitting. Real AdaBoost has also been used quite frequently and successfully in the past for the task of facial alignment. The Real AdaBoost framework not only allows for the classification of a feature vector as positive or negative (misaligned or possibly occluded), but also ensures that a confidence score in the prediction can be returned. This allows us to greedily retain the highest scoring locations in the response map for a particular seed landmark when a search over the typical region where the landmark is likely to lie is performed on a test face crop. To account for in-plane rotation of the face, the search is repeated for rotated versions of the crop (typically for rotation angles between −30° and +30° in 15° increments). We typically retain around 8-10 of these candidates for each seed landmark (over all the rotation angles) and use clustering to reduce their numbers if several of the candidates are found within a small bandwidth. FIG. 4 shows how we retain candidates for the various seed landmarks for a particular pose specific model.

Once pose specific seed landmark candidates are obtained, the task at hand becomes one of selecting a single combination of candidates for 2 different seed landmarks that allows for the optimal initialization of a pose specific mean facial shape consisting of the full set of facial landmarks for that pose model, i.e. alignment of a dense set of pose specific landmarks. At this point it becomes necessary to provide details on how shape models (also sometimes referred to as Point Distribution Models (PDMs)) for CLM based approaches work. Each facial shape s in the training set is represented by its N x and y coordinates in vectorial form as $s=(x_1\ x_2\ \ldots\ x_N\ y_1\ y_2\ \ldots\ y_N)^T$ These shapes are aligned using Generalized Procrustes Analysis (GPA) to remove scale, rotation, and translation effects and bring them into a common reference frame In this reference frame, conventional PDMs are built by obtaining a mean facial shape $\bar{s}$ and by constructing a subspace $\Phi$, of facial shape variation using PCA. In such a framework a facial shape can be approximated using Equation (1), in which T is a similarity transformation parametrized by a scaling factor s, a rotation angle $\theta$, and translation parameters $x_t$ and $y_t$. The transformation caused by T to a single point (x, y) is shown in Equation (2).

$$T_{o,\theta,x_t,y_t}\begin{pmatrix}x\\y\end{pmatrix}=\begin{bmatrix}s\cos\theta & -s\sin\theta\\s\sin\theta & s\cos\theta\end{bmatrix}\begin{bmatrix}x\\y\end{bmatrix}+\begin{bmatrix}x_t\\y_t\end{bmatrix} \quad (2)$$

The entire shape fitting process centers around the determination of the optimal vector shape coefficients b that best approximates (and regularizes) the current set of landmarks that are determined using patch experts.

Because facial shape varies dramatically with pose and expressions, we construct 16 pose and expression specific PDMs in our approach. However, our approach to determine the shape coefficients is a novel method that does not use the conventional shape model equation in (1). Instead of using PCA to determine our set of basis vectors, we retain the entire set of shapes in a pose and expression specific dictionary that we later use in an P, $l_1$-regularized least squares approach to determine the shape coefficients. However, we do retain the building of pose and expression specific mean shapes in our approach as well. It is the M=10 pose specific mean shapes $\bar{s}^m$ (m=1, . . . , M) that we use to determine the best initialization that can be provided for each pose range (the best fitting mean shape roughly aligned over the face for each pose range).

Figure 5:
FIG. 5 shows samples of initially aligned shapes for the M=10 pose models. In all facial images with landmarks overlaid on them, green dots are used to indicate the seed landmark candidates used to generate the aligned shapes, yellow dots are used to indicate the locations of facial landmarks, blue line segments indicate that the landmark at their center is accurately localized, and red line segments indicate that the landmark at their center is misaligned or potentially occluded.

FIG. 5 illustrates how each of 10 pose specific mean shapes is aligned with every combination of seed landmark candidates for that pose and then scored using a scoring function. It is to be noted that before the scoring is performed, the region around the shape is cropped and de-rotated (since the angle of rotation required can be calculated using two fixed landmarks) in order to match our training crops. For profile poses, a fewer set of shapes need to be evaluated as there are fewer seed landmarks. For example, in a frontal case with 8 seed landmarks taken 2 at a time with 10 candidates for each of them, the number of shapes that would need to be scored is J=10×10×($_2^8$)=2800, while for a profile case with 5 seed landmarks, the corresponding number would only be J=1000. All of these shapes $s^{j,m}$ (j=1, . . . , $J_m$) must be scored in a way that maximizes the joint probability of correct alignment of the landmark coordinates $x_n^{j,m}=[x_n^{j,m}\ y_n^{j,m}]^T$ (n=1, . . . , $N_m$) in the shape.

This joint probability of correct alignment for the full set of $N_m$, landmarks in shape $s^{j,m}$ $$P(I_1^{j,m}=1, I_2^{j,m}=1, \ldots, I_{N_m}^{j,m}=1 \mid s^{j,m}) = \prod_{n=1}^{N_m} P(I_n^{j,m}=1 \mid x_n^{j,m}) \quad (3)$$

for a particular pose model m is given by (3), assuming the conditional independence of the individual probabilities of correct alignment for the landmarks. In (3), $I_n^{j,m} \in \{-1, +1\}$ (n=1, . . . , $N_m$) denotes whether landmark $x_n^{j,m}$ is correctly aligned or not.

To use Equation (3) as the objective function to maximize to find the highest scoring fitting shape would require the modeling of the individual probabilities for each landmark. This could be carried out by modeling the distributions of the texture features extracted around each landmark using parametric or non-parametric methods. However, there are simpler scoring functions that could be used as surrogates for this joint probability function that suit our purpose. The key point to take note of here is that only a finite set of shapes need to be evaluated and scored and that this is a different problem from one that involves the optimization of a continuous function. It is for this reason that we use a different scoring function in order to evaluate the set of mean shapes aligned using the various seed landmark candidates and pick the highest scoring shape. This scoring function $f(s^{j,m})$ is given by the following equations.

$$r(x_n^{j,m}) = \frac{r_{pos}(x_n^{j,m})}{r_{neg}(x_n^{j,m})} \quad (4)$$

$$R^{j,m} = \frac{1}{N_m} \sum_{n=1}^{N_m} r(x_n^{j,m}) \quad (5)$$

$$f(s^{j,m}) = \frac{N_{inliers}^{j,m}}{R^{j,m}} \quad (6)$$

In Equation (6), $N_{inliers}^{j,m}$ is the number of inliers in shape $s^{j,m}$, i.e., the number of landmarks in the shape that are classified as being accurately aligned by our local texture based classifier (working in HOG feature space). Thus, whether a landmark is deemed to be correctly localized or not is gauged by determining how well it's surrounding local texture matches pre-trained models of what this local texture looks like in a particular feature space. $R^{j,m}$, the denominator term on the right hand side of the equation in Equation (6), is the mean of the ratio of reconstruction errors produced by projecting the texture feature vector obtained around each landmark onto the respective subspace constructed using positive samples (sampled from training data at the ground truth locations for that landmark) and onto the respective negative subspace constructed using negative samples (sampled from training data at locations displaced from the ground truth locations for a landmark), reconstructing the feature vector using the respective subspace, and then calculating the norm of error between the reconstruction and the original feature vector. The norm of the reconstruction error produced for landmark $x_n^{j,m}$ using the subspace of positive samples is denoted by $r_{pos}(x_n^{j,m})$, while the corresponding norm of the reconstruction error produced using the subspace of negative samples is denoted by $r_{neg}(x_n^{j,m})$. Equation (7) shows how the feature vector $t_n^{j,m}$ (obtained using the local texture around $x_n^{j,m}$) is projected onto the positive subspace $\Psi_{pos_n}^m$ (after subtracting the mean texture vector $\bar{t}_{pos_n}^m$ for the subspace) for that landmark and yaw angle to obtain coefficients $c_{pos_n}^m$. Subsequently, these coefficients are used to generate a reconstruction $t'_{pos_n}^{j,m}$, using Equation (8), and then finally used to compute the norm of the reconstruction error vector $r_{pos}(x_n^{j,m})$ using Equation (9). The same process is followed using the negative subspace for the specific landmark to obtain $r_{neg}(x_n^{j,m})$.

$$c_{pos_n}^m = (\Psi_{pos_n}^m)^T (t_n^{j,m} - \bar{t}_{pos_n}^m) \quad (7)$$

$$t'_{pos_n}^{j,m} = \bar{t}_{pos_n}^m + \Psi_{pos_n}^m c_{pos_n}^m \quad (8)$$

$$r_{pos}(x_n^{j,m}) = \|(t'_{pos_n}^{j,m} - t_n^{j,m})\|_2 \quad (9)$$

Figure 6:
FIG. 6 shows the highest scoring aligned initial shapes for each of the M=10 pose models. In all facial images with landmarks overlaid on them, green dots are used to indicate the seed landmark candidates used to generate the aligned shapes, yellow dots are used to indicate the locations of facial landmarks, blue line segments indicate that the landmark at their center is accurately localized, and red line segments indicate that the landmark at their center is misaligned or potentially occluded.

The idea here is that a correctly localized landmark will produce a high reconstruction error using the negative subspace and a low reconstruction error using the positive one. Thus, the mean of the ratio of reconstruction errors $R^{j,m}$ for a shape which is well aligned at pose m will be lower than for a poorly aligned shape. Similarly, a well aligned shape will contain more inliers than a poorly aligned one and hence will end up with a high value for the numerator and a low value for the denominator in Equation (6). The highest scoring aligned shape $s_{init}^m$ for each pose from among the $J_m$ shapes evaluated using a mean shape $\bar{s}^m$ can be determined using Equations (10) and (11) and used as initialization for our final step in the alignment process. FIG. 6 shows these highest scoring aligned shapes for each pose for a sample test image.

$$j_0 = \arg\max_j f(s^{j,m}) \tag{10}$$

$$s_{init}^m = s^{j_0,m} \tag{11}$$

The last stage of the alignment algorithm involves the refining (deforming and regularizing of a shape) the highest scoring initial shapes that were obtained using the previous stage and the selection of one of these refined shapes to determine the final locations of the facial landmarks. To carry this out we use an iterative fitting process that has it roots in ASMs and CLMs. In practice, to allow for a gain in fitting speed, only a few (M'<M) (with an appropriate mapping of indices to account for the pose specific models) of the highest scoring fitting M initial shapes $s_{init}^m$ (m=1, ..., M) are selected for refinement to obtain shapes $s_{ref}^{m'}$ (m'=1, ..., M'). It is also to be noted that during the refinement process, the open mouth expression shape and texture models for the frontal pose ranges are also evaluated (with initialization provided using the closed mouth expression models).

Figure 7:
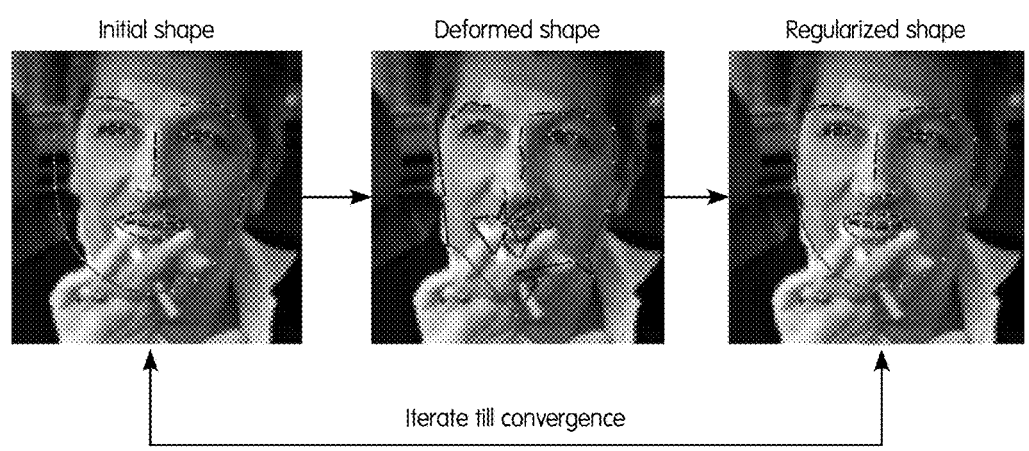
FIG. 7 shows the iterative process used in our shape refinement step. An initial shape (for a specific pose model) is deformed by allowing the independent motion of landmarks into the optimal (highest scoring) locations for them in a window around their current locations. The deformed shape is regularized to smooth out the shape generated and make it conform to what a typical facial shape looks like. The process is repeated for a few iterations until convergence. In all facial images with landmarks overlaid on them, yellow dots are used to indicate the locations of facial landmarks, blue line segments indicate that the landmark at their center is accurately localized, and red line segments indicate that the landmark at their center is misaligned or potentially occluded.

A window around each landmark's current location is generated and the local texture around each pixel in the window is scored and classified using our local texture classifiers. The landmarks are independently moved into the highest scoring locations for them. The process is repeated for a few iterations until the landmarks converge. However, between each iteration, the facial shape produced as a result of landmark motion must be regularized in order to generate a shape that is consistent with what a typical facial contour looks like. We carry out this regularization using a novel technique that allows for a higher fitting accuracy compared to the regularization method employed by ASMs. FIG. 7 illustrates how one iteration of this process is carried out. Finally, the highest scoring shape from among the refined shapes is identified and returned to obtain the final coordinates of the landmarks.

As has been previously mentioned, the task of shape regularization involves the determination and updating of a vector of shape coefficients. Consider an initial shape $s_{init}^{m'}$ (we drop the superscript in this section for convenience of notation). After each of the landmarks in the shape have been allowed to independently move into the optimal locations for them, the new shape obtained is denoted by $s_{def}$. In an ASM based approach, the similarity transformation T that best aligns $s_{def}$ with the mean shapes is applied to sdef to generate $s'_{def}$. The problem becomes one of determining the optimal set of shape coefficients $b_{init}$ to minimize (12).

$$b_{init} = \arg\min_b \|\Phi b - (s'_{def} - \bar{s})\|_2^2 \tag{12}$$

In Equation (12), Φ is a previously trained orthonormal PCA subspace of shape variation (all shapes being aligned using Procrustes analysis before the building of the subspace) with dimensions d×u (d>u) where d=2N is the dimension of each shape vector, u is the number of eigenvectors retained in order to account for 95-97% of the shape variance, and $\bar{s}$ is the mean shape. The solution to the overdetermined least squares problem in Equation (12) is given by Equation (13), since Φ, is an orthonormal basis and $\Phi^T\Phi=I$.

$$b_{init} = \Phi^T(s'_{def} - \bar{s}) \tag{13}$$

With a PCA framework used in the computation of the shape coefficients, the assumption is that the shape coefficients vector can be modeled using a zero mean Gaussian distribution. Thus, the values of $b_{init}$ are saturated to not lie beyond 3 standard deviations of their zero mean values in order to generate plausible shapes (regularization). This clipping of values results in a new vector of shape coefficients denoted by $b_{mod}$. When these coefficients are applied and the resulting shape is aligned back into the image space using the inverse transformation $(T)^{-1}$, as shown in Equation (14), a final regularized shape $s_{reg}$ is obtained.

$$s_{reg} = (T)^{-1}(\bar{s} + \Phi b_{mod}) \tag{14}$$

Our approach uses a different shape model and regularization method to the previously described one. Rather than constructing a PCA subspace to model shape variation, we retain the entire dictionary of shapes for each pose model. Thus in our approach, the analogue to the previously defined Φ is a dictionary of shape variation D of size d×v (d<v), where d=2N is the dimension of each shape vector in the dictionary and v is the number of such training shapes for a specific yaw model. We recast the problem of shape regularization using Equation (15), in which λ is a regularization parameter, and generate a regularized shape using Equation (16).

$$\hat{b} = \arg\min_b \|Db - s'_{def}\|_2^2 + \lambda\|b\|_1 \tag{15}$$

$$s_{reg} = (t)^{-1}(D\hat{b}) \tag{16}$$

What we achieve by formulating the problem in this fashion is that simultaneous determination and regularization of shapes is now possible using a single objective function without the need for the additional step involved in ASMs to modify the shape coefficients based on the Gaussian assumption. Our formulation makes no assumptions about the distribution of the coefficients, is not a linear function of $s'_{def}$ (as is the case in Equation (12)), and allows for a data driven framework to achieve regularization. Also, while achieving sparsity is not our goal, it is preferable if many of the shape coefficients are forced to zero (or close to zero) in order to reconstruct the current shape estimate using as few training samples in the dictionary as possible.

The problem in Equation (15) is commonly called the $l_1$-regularized Least Squares Problem (LSP) whose general form is given by Equation (17), in which $A \in \mathbb{R}^{p \times q}$ is a data matrix, $y \in \mathbb{R}^p$ is a vector of observations, $x \in \mathbb{R}^q$ is a vector of unknowns, and λ>0 is the regularization parameter.

$$\min_x \|Ax - y\|_2^2 + \lambda\|x\|_1 \tag{17}$$

The problem in Equation (17) is convex but not differentiable. The problem always has a solution (though it may not be unique), but there is no closed form equation to obtain it. However, it is possible to compute a solution numerically. An $l_1$-Regularized LSP can be transformed into a convex quadratic problem with linear inequality constraints and solved by standard convex quadratic methods, such as interior-point methods, homotopy methods and variants, and also by subgradient methods. However, some of these solvers can be quite slow and also only efficient when the solution is very sparse. It is to be noted that the intrinsic details of these solvers is beyond the scope of this document, however, we found that a custom interior point based method for solving large scale $l_1$-regularized LSPs that was developed by Kim et al. was ideally suited for our purposes and is the solver we use in the rest of this study. Kim et al. also provides details on the limiting behavior of the solution to the problem as $\lambda \to 0$ and $\lambda \to \infty$. A key result that governs the choice of the regularization parameter $\lambda$ is that for $\lambda \geq \lambda_{max} = \|2A^T y\|\infty (\|2D^T s'_{def}\|\infty$ in our problem setup) an all zero vector becomes the optimal solution.

It is to be noted that shape regularization can be carried out more accurately if only inliers (accurately fitted landmarks) are used in the process and if outliers (misaligned or potentially occluded landmarks with low confidence scores produced by local texture classifiers) are excluded, Since this is possible in our approach, using the results produced by local texture classifiers, we exclude all outliers from participating in the shape regularization process and only use the rows of D ($\Phi$ in the case of the previously described PCA based approach that is used by ASMs) that correspond to these inlier landmarks. The shape coefficients obtained using this process can be used to reconstruct a full set of landmarks and hallucinate the locations of the outliers. An important result that we highlight in section 9.5 is that even when only the inliers are used for shape regularization, our $l_1$-regularized approach outperforms the previously outlined approach used in ASMs to obtain more accurate fitting results on several datasets.

The last step is the selection of a single shape from among the set of M' refined shapes that best fits the underlying facial structure. The shape $s_{fin}$ with the highest percentage of inliers, expressed as a percentage of the total number of landmarks in the shape using the scoring function $g(s_{ref}^{m'})$ in (18), is chosen to obtain a final set of landmark coordinates using the following equations.

$$g(s_{ref}^{m'}) = \frac{N_{m'}^{inliers}}{N_{m'}} \text{ where } m' = 1, \ldots, M' \qquad (18)$$

$$m'_0 = \arg\max_{m'} g(s_{ref}^{m'}) \qquad (19)$$

Details will now be provided on how the approach outlined herein was trained and of two experiments that were carried out to demonstrate the effectiveness of the method. In the first experiment we benchmarked the approach against a few other state-of-the-art methods on several challenging datasets. In the second experiment we evaluated the fitting accuracy of our method on low resolution images generated using images from outside our training set but drawn from the same database.

The models were trained using a subset of the CMU Multi-PIE (MPIE) database. The MPIE database consists of over 750,000 images of 337 subjects captured over 4 sessions under controlled illumination and pose conditions to span 15 viewpoints (that cover the entire range of yaw variation from −90° to +900), 20 illumination conditions, and 6 different facial expressions. The shape and texture models were trained using a total of 6495 images of various subjects drawn from across all 4 sessions that spanned 13 sets of viewpoints from −90° to +900 in steps of 15° (images from the two overhead viewpoints were not used by us) and the various expressions. We manually clustered the data into M=10 bins with overlapping yaw ranges and the same number of facial landmarks for every image in the bin, i.e., −90° to −75°, −75° to −60°, −45° to −30°, −30° to −15°, −15° to 0°, and 5 more similar bins for the positive yaw angles. These 10 partitions were created using facial images with the mouth slightly open or closed (neutral, smile, squint, and disgust expressions). A similar set of 6 partitions (for frontal poses with yaw angles from −45° to +450 only) were created to model the shape and texture of facial landmarks across pose in expressions when the mouth is completely open (surprise and scream). Thus, a total of 16 pose and expression specific global shape and local texture models were trained by us. Manually annotated ground truths for all these images were available to us as a small subset of the MPIE database was annotated using 68 landmarks for frontal faces and 39 landmarks for profile faces by the database's benchmark curators. A further set of 400 images with manual annotations for profile images was also incorporated into our training set.

The entire training set (of 6495 images) was used to build our models for use in experiment 1 using the process previously described with Real AdaBoost as our choice of classifier for an illustrative embodiment. However, when we tested on a subset of the MPIE dataset, we only trained on three-fourths of the training data with the test set drawn from the remaining images. Thus, we always tested our algorithm on unseen images and subjects. 200 decision stumps were used as the weak classifiers in the ensemble of classifiers that were built separately for every landmark for a specific pose and expression. An open source MATLAB toolbox was used to extract the HOG features and implement the training and testing of the Real AdaBoost framework. A standard facial crop size of 100×100 and a patch size of 15×15 (that were found to be optimal) were used to extract HOG feature descriptors and build the local texture models (classifiers) with a total of 5 positive samples extracted from the ground truth locations and locations that were 1 pixel away from the ground truths and 50 negative samples extracted from locations both close to and far away from the ground truth landmark locations for each landmark and image.

Experiment 1:

Having trained our models suing MPIE images and annotations, we proceeded to compare its fitting accuracy against that of a few existing state-of-the-art methods on a few challenging datasets, some of which contained real-world images acquired under unconstrained settings. The first known method we chose to benchmark the invention against was an approach referred to herein as Tree-DPMs, for which open source code is available. We used their pre-trained and best performing Independent-1050 model (1050 independent parts or templates for each landmark across all views) that was trained on 900 positive (face) samples drawn from the MPIE database across 13 viewpoints and 1218 negative (non-face) samples from the INRIA Person database. The second known approach against which we compare our method is referred to herein as DRMF, for which open source testing code is available. Both approaches use the same 68 point landmarking scheme to annotate frontal facial images and a 39 point landmarking scheme for profile images (Tree-DPMs only), making a fair comparison possible on test datasets.

Details on the various datasets we used to benchmark all of these approaches are provided below.

LFPW: The Labeled Face Parts in the Wild (LFPW) dataset originally consisted of 1132 training images and 300 test images of various people (mainly celebrities) that were collected from the Internet and manually annotated with 29 landmarks. Many of the URLs for the images in the dataset have expired, however, a set of 811 training images and 224 test images were recently made available along with landmark annotations for the 68 landmarks in the MPIE markup as part of the 300 Faces in-the-wild (300-W) challenge. The images in the dataset do not exhibit severe occlusion levels but do contain faces with yaw angles of up to 300.

COFW: The Caltech Occluded Faces in the Wild dataset consists of 500 training and 507 test images that were downloaded from the Internet. All images were manually annotated with 29 landmarks. The faces in the images exhibit pose variation (yaw angles of up to 30°-45° and sometimes severe in-plane rotation), varying expressions, and large levels of occlusion (the average level of occlusion present in faces in the dataset, due to hats, sunglasses, food, etc, is 23%). The dataset was created to test the occlusion tolerance of facial alignment algorithms and thus also provides occlusion labels for each landmark.

MPIE: A set of 850 images were held back from our training set and served as a test set of MPIE images containing a full range of yaw variation from −90° to +90° along with expression variation. This test set was created to demonstrate that our algorithm could deal with such variations in unseen images from outside its training set and was also used to benchmark our approach against the Tree-DPMs algorithm, which could also handle this range of yaw variation.

MPIE occluded: The same set of 850 images that were held back from our training set were corrupted using random noise to simulate occlusions. This was done by generating a patch at a random location on the face (in each image) of random width and height ranging from 30% to 50% of the respective width and height of the face and filling the patch with random pixel values. Occlusion labels for all landmarks were also generated (as ground truths were available). This test set was used by us to simulate the joint presence of occlusions along with facial pose (full range of yaw variation from −90° to +900) and expression variation and to gauge the efficacy of our algorithm in predicting the locations of the occluded landmarks.

For initializing the algorithms on the LFPW and COFW datasets, we used the bounding box initializations provided along with the datasets that were obtained using a face detector. Since our approach requires a bounding box that matches the aspect ratio of our training crops (a square crop that encloses most of the facial region), we converted the provided bounding boxes into square regions and also expanded the widths and heights of the regions by a factor of 1.5 to enclose the face. We must point out that our method is insensitive to the facial crop (since we train our algorithm without using a face detector to generate the training crops) and that we only carry out this normalization in order to ensure that the crop is a square region that has sufficient padding to allow for local texture crops to be generated and evaluated by our classifiers. Also, our initial search regions for the seed landmark candidates were fixed based on this choice of crop region, but can be changed if the crop region changes. A similar technique was followed to provide the Tree-DPMs method with a padded facial region so that the crop was not too tight. Such an initialization is a fair way to benchmark the landmark localization accuracy of this method, which is also capable of face detection. DRMF was initialized without any change to the bounding boxes as this was specified to be optimal for its accuracy. For the MPIE and MPIE occluded datasets, a tight square crop around the ground truth landmark locations was extracted and then grown by a factor of 1.5 before being provided as initialization to Tree-DPMs and our approach. DRMF was not evaluated on these datasets as it is not designed to handle a facial yaw angle in excess of 45°.

Figure 8:
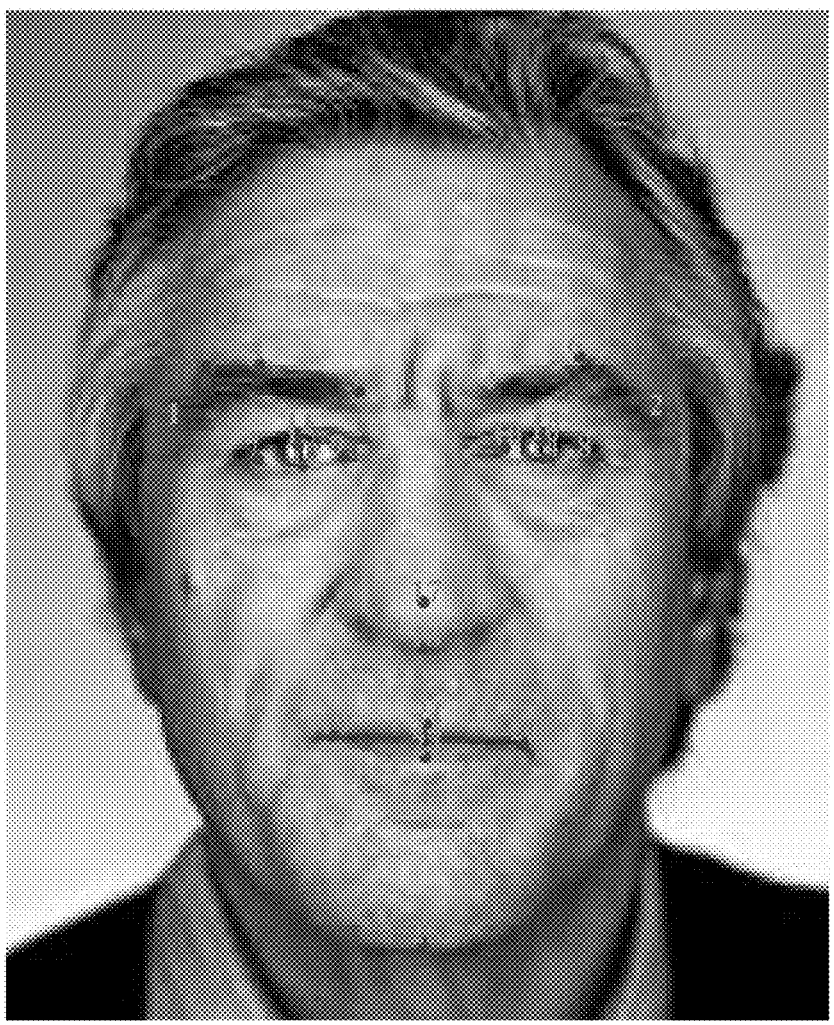
FIG. 8 shows the 25 landmarks common to both the 68 point MPIE landmarking scheme and the ground truth (29 landmarks for each facial image) annotations available for the COFW dataset. The facial image is from the COFW dataset.
Figure 9A:
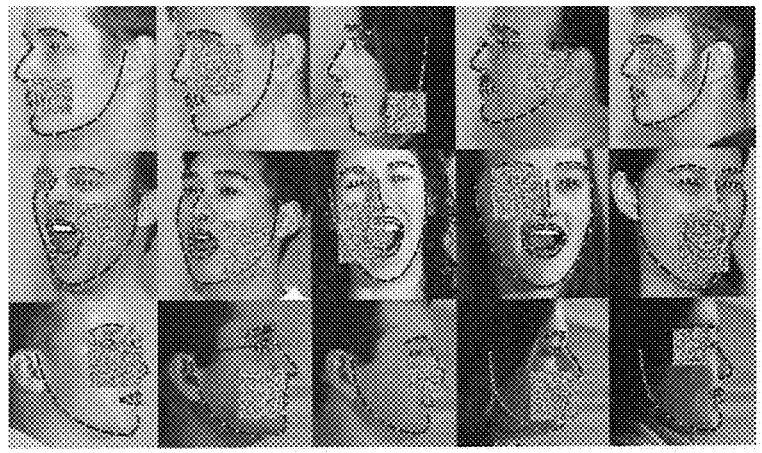
FIGS. 9A-C show qualitative results produced by our approach on some images from various datasets.
Figure 9B:
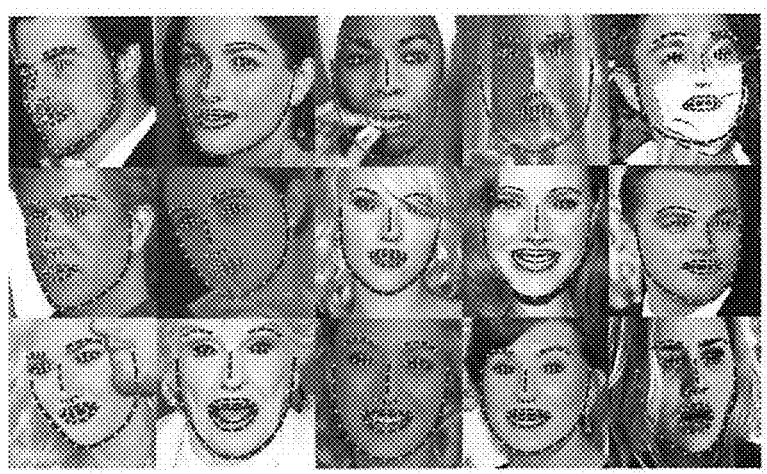
Figure 9C:
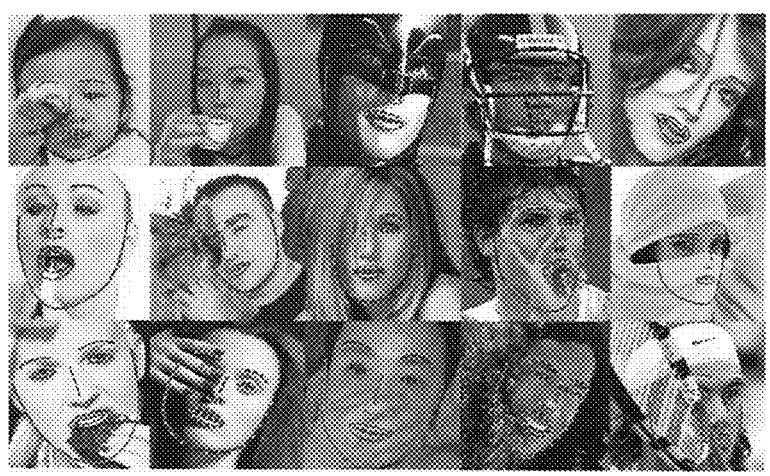
Figure 10A:
FIGS. 10A-C show a comparison of qualitative results produced by DRMF (top row in FIGS. 10B and 10C), Tree-DPMS (top row in FIG. 10A and middle row in FIGS. 10B and 10C), and our approach (bottom row in FIGS. 10A, 10B and 10C) on some images from FIG. 10A MPLE occluded, FIG. 10B, LFPW, and FIG. 10C, COFW datasets. For results produced by DRMF and Tree-DPMs, yellow dots are used to indicate the locations of facial landmarks and blue line segments are used to connect the landmarks and indicate different components of the face. For results produced by our approach, yellow dots are used to indicate the locations of facial landmarks, blue line segments indicate that the landmark at their center is accurately localized, and red line segments indicate that the landmark at their center is misaligned or potentially occluded.
Figure 10B:
Figure 10C:

Our method was configured to always output a set of 68 landmarks for the LFPW dataset as the ground truths always corresponded to 68 landmarks. Comparing the fitting error when 39 landmarks are provided, instead of 68, is not possible due to a lack of correspondence between each of the landmarks in the 39 and 68 point landmarking schemes. Thus, we report results over (average over) only those images where the Tree-DPMs method determined a set of 68 landmarks (the same set being determined by all the other methods). For the COFW dataset, where only 29 manually annotated landmarks are available, we measure the fitting accuracy of the algorithms using a set of 25 landmarks which are common to both the 29 point and 68 point markups. This set of landmarks is shown in FIG. 8. Sample qualitative results showing the results of our facial alignment algorithm on images from the various datasets are shown in FIGS. 9A-C. The fitting results demonstrate the tolerance of our approach to pose, expression, and occlusion variations. FIGS. 10A-C compare fitting results produced by our approach against those produced by DRMF (on, the LFPW and COFW datasets only) and Tree-DPMs (on the MPIE occluded, LFPW, and COFW datasets) and demonstrates how our approach handles challenging pose variations and the presence of occlusions in images that cause the other two approaches to fail.

TABLE 1

Performance summary of various algorithms when tested on four test datasets. MNFE denotes the mean normalized fitting error produced after the average fitting errors over all landmarks were normalized and then averaged over all images. The standard deviation values (SD-NFE) of the normalized fitting error values over all images are also reported.

| | Algorithm | | | | | | | | |
| --- | --- | --- | --- | --- | --- | --- | --- | --- | --- |
| | DRMF | | | Tree-DPMs | | | Our Approach | | |
| Dataset | MNFE | SD-NFE | Failure | MNFE | SD-NFE | Failure | MNFE | SD-NFE | Failure |
| MPIE | N/A | N/A | N/A | 6.70 | 2.64 | 10.00 | 5.41 | 2.06 | 3.50 |
| MPIE occluded | N/A | N/A | N/A | 7.75 | 3.22 | 17.38 | 6.68 | 5.37 | 9.50 |

TABLE 1-continued

Performance summary of various algorithms when tested on four test datasets. MNFE denotes the mean normalized fitting error produced after the average fitting errors over all landmarks were normalized and then averaged over all images. The standard deviation values (SD-NFE) of the normalized fitting error values over all images are also reported.

| | Algorithm | | | | | | | | |
|---|---|---|---|---|---|---|---|---|---|
| | DRMF | | | Tree-DPMs | | | Our Approach | | |
| Dataset | MNFE | SD-NFE | Failure | MNFE | SD-NFE | Failure | MNFE | SD-NFE | Failure |
| LFPW | 17.96 | 12.99 | 63.65 | 9.61 | 5.64 | 32.83 | 7.53 | 3.92 | 12.69 |
| COFW | 11.76 | 9.31 | 37.83 | 9.67 | 7.79 | 28.37 | 8.50 | 6.41 | 21.04 |

To compare the fitting accuracy of the various algorithms, the fitting error (the Euclidean distance between the automatically fitted landmarks and their corresponding manually annotated ground truth locations) was normalized using the distance between the corners of the eyes (landmarks 37 and 46 for the frontal landmarking scheme in FIG. 2B and landmarks 7 and 8 in FIG. 8), as was carried out in the 300-W challenge, for each image to enable a fair comparison across all images (of varying resolution and facial sizes) in the datasets. For the MPIE and MPIE occluded datasets, the eye center-mouth corner distance was used for normalization as these datasets contained images with profile views and only one eye visible and annotated. These distances were averaged over all landmarks to produce a normalized fitting error for each image in the dataset. The Mean Normalized Fitting Error (MNFE) of these fitting errors, calculated by averaging the normalized fitting error over all images in the test dataset, is the metric commonly employed to determine the accuracy of a facial alignment algorithm. These MNFE values as well as the standard deviation of the normalized fitting errors (denoted by SD-NFE) over all images (as a percentage of the normalization distance) produced by the various algorithms on all the test datasets are reported in Table 1. Another metric that is used to compare the approaches is the failure rate. This is computed as the percentage of the total images fitted that have a mean normalized fitting error greater than 10% of the normalization distance. Table 1 shows that our approach demonstrates a much higher accuracy and lower failure rate than the other approaches on all the test datasets. This serves as proof of the ability of our approach to handle unseen variations that are radically different from the training data it is trained on.

TABLE 2

Occlusion/misalignment prediction performance of our algo hm on o test datasets.

| Dataset | Accuracy | True Positive Rate (%) | False Positive Rate (%) |
|---|---|---|---|
| MPIE occluded | 87.19 | 72.37 | 9.95 |
| COFW | 70.43 | 57.10 | 25.68 |

Figure 11A:
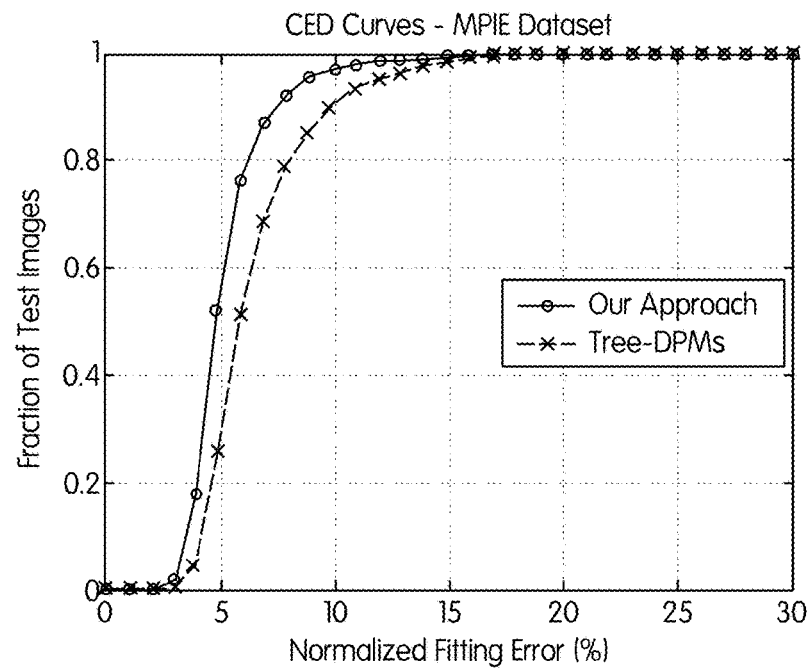
FIGS. 11A-D show Cumulative Error Distribution (CED) curves for various algorithms obtained by plotting the fraction of facial images (along the y-axis) found to have a normalized fitting error percentage lower than a certain value (plotted along the x-axis).
Figure 11B:
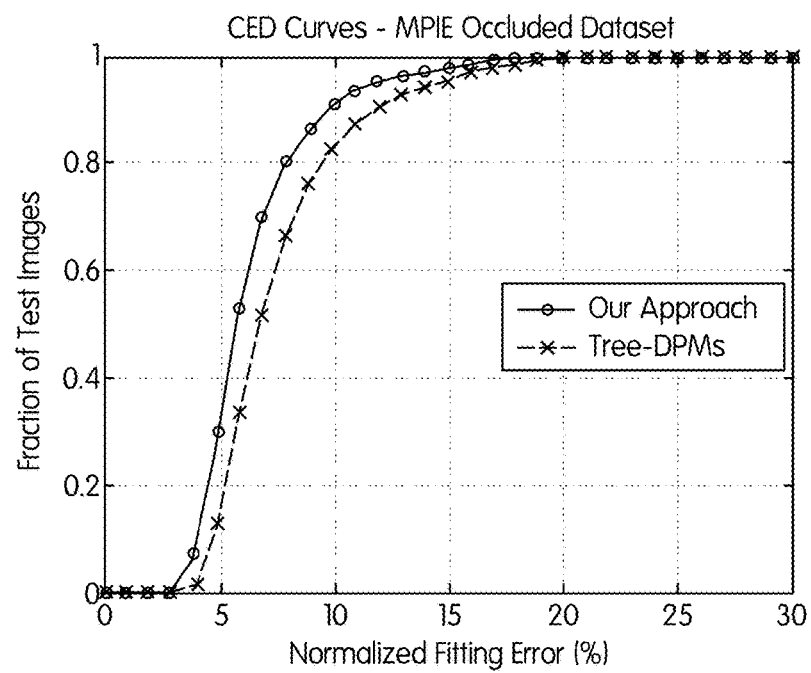
Figure 11C:
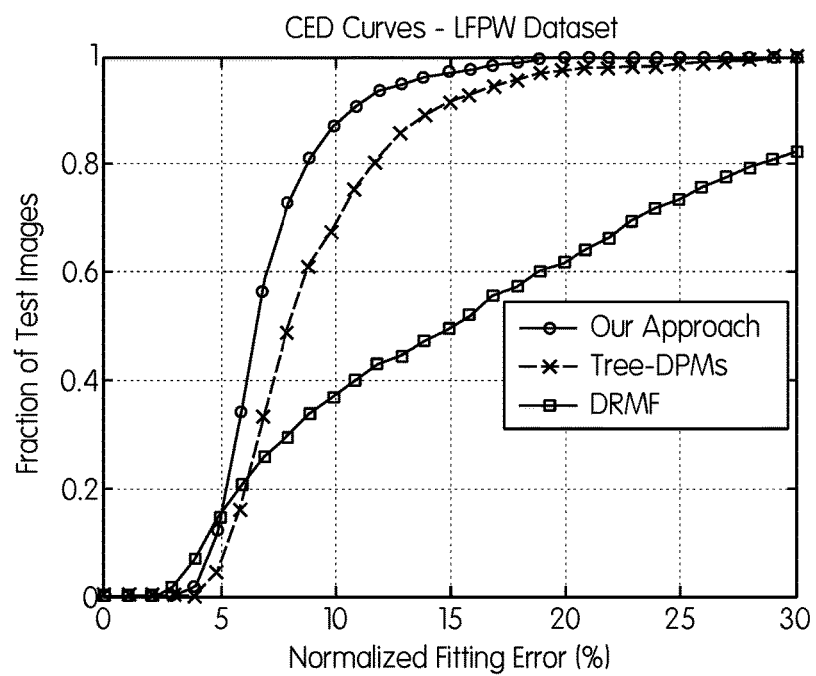
Figure 11D:
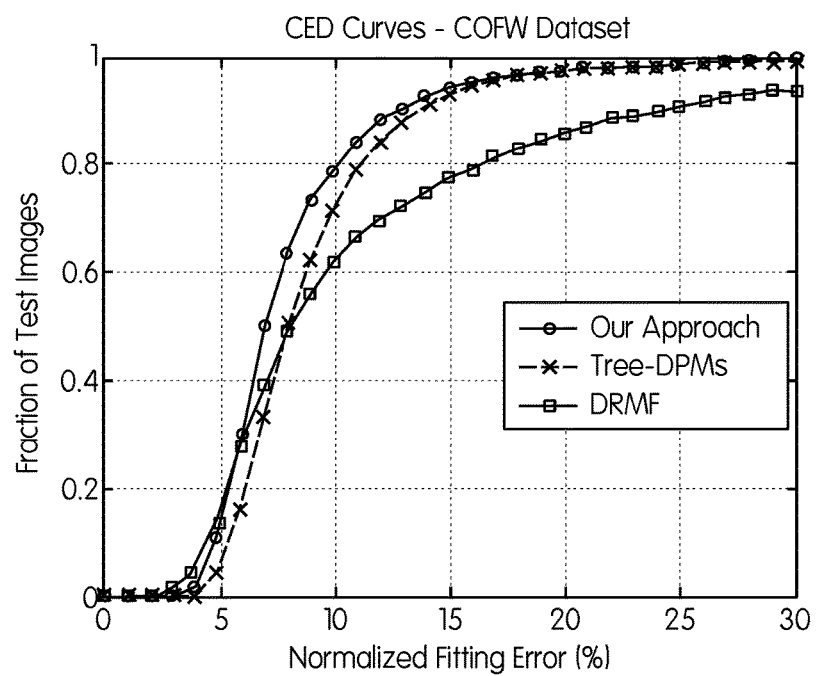
Figure 12A:
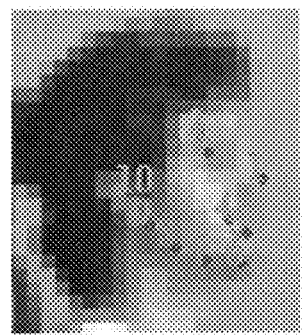
FIGS. 12A-D show the application of the methods of the present invention to extremely low resolution faces.
Figure 12B:
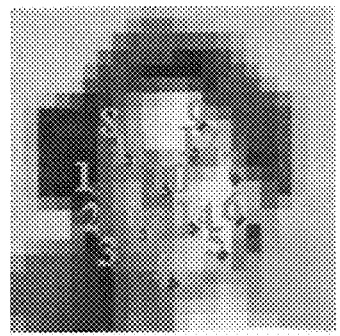
Figure 12C:
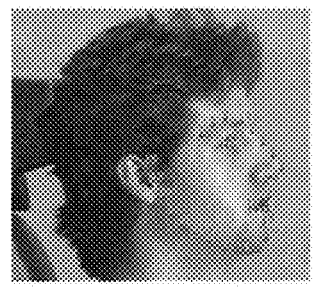
Figure 12D:

An alternative way of comparing the accuracy of the methods is using Cumulative Error Distribution (CED) curves that plot the fraction of facial images (along the y-axis) found to have a normalized fitting error percentage (determined by averaging the normalized fitting errors over all the landmarks in the facial image) lower than a certain value (plotted along the x-axis). CED curves summarizing the performance of the various methods on the various datasets are shown in FIGS. 11A_D. From FIGS. 11A-D it is again clear that our approach is more accurate than the other algorithms it is benchmarked against.

Table 2 provides details on the misalignment/occlusion prediction performance of our approach on the COFW and MPIE occluded datasets, for which occlusion labels are available for all landmarks. It is the true positive rate (number of true positive detections (TP)/total number of positive samples (P)) of prediction of occluded landmarks that is the most significant of the performance metrics reported because it is more potentially more damaging to a subsequent algorithm that uses facial landmarks (such as a recognition algorithm) to label a landmark as not occluded when it is than the other way around. Hence, the false positive rate (number of false positive detections (FP)/total number of negative samples (N)) is of lower consequence. The accuracy rates ((TP+TN)/(P+N)) for occlusion classification on the two datasets are also reported in the table. Our algorithm's performance on the MPIE occluded dataset is predictably better than its performance on the highly unconstrained COFW dataset.

Finally, we also would like to draw attention to a key aspect of our fitting process that highlights the rationale behind our novel addition to the shape regularization stage. For each of the datasets, we selected all images with a mean normalized fitting error percentage lower than 10% and refit these images at the final shape refinement stage using the shape regularization technique that has been used in prior ASM implementations and described in section 9.1. It is evident from Table 3 that our 4 regularization approach consistently provides more accurate results (both MNFE and SD-NFE values) than the previously developed shape regularization approach. These results demonstrate why our $l_1$ based shape fitting approach is an important contribution to the facial landmark localization procedure.

TABLE 3

Comparison of fitting error statistics produced when our 4-regularized least squares based shape coefficients determination is used against those produced using the prior ASM based shape constraining approach on four test datasets. MNFE denotes the mean normalized fitting error produced after the average fitting errors over all landmarks were normalized and then averaged over all images. The standard deviation values (SD-NEE) of the normalized fitting error values over all images are also reported.

| | Shape Regularization Technique | | | |
|---|---|---|---|---|
| | ASM Approach | | Our Approach | |
| Dataset | MNFE (%) | SD-NFE (%) | MNFE (%) | SD-NFE (%) |
| MPIE | 5.79 | 1.56 | 5.15 | 1.32 |
| MPIE occluded | 7.38 | 2.25 | 5.84 | 1.52 |
| LFPW | 7.49 | 1.68 | 6.57 | 1.46 |
| COFW | 7.38 | 1.87 | 6.60 | 1.48 |

In this experiment we trained our approach on low resolution images and aimed at understanding how fitting accuracy was impacted when testing on unseen images of the same resolution. Our training set consisted of three-fourths of the full set of manually annotated data from the MPIE database that we had available to us, while our test sets were the MPIE and MPIE occluded datasets that we used in our first experiment. Our models were trained by downsampling the training images, and correspondingly the manual ground truths, to scales of ½, ¼, ⅛, and ¹⁄₁₆, that respectively corresponded to facial sizes of 80×80, 40×40, 20×20, and 10×10. Table 4 summarizes the typical facial size at these scales, the standard crop sizes we used (a region 1.5 times the facial size cropped from around the center), and the corresponding patch sizes we used to extract HOG features and hence train our classifiers. We also include results from the case when the original images were used, corresponding to a scale of 1 and a facial size of 160×160. It must be noted that for the ⅛ and ¹⁄₁₆ scale cases we used fewer landmarks to represent each shape (36 landmarks for frontal cases and 21 landmarks for profile cases for the ⅛ scale and 14 landmarks for frontal cases and 10 landmarks for the profile cases for the ¹⁄₁₆ scale) because at these resolutions establishing unique pixel correspondences for a denser set of landmarks is not possible. FIGS. 12A-D show the landmarking schemes that were used at these extremely low resolutions.

Figure 13A:
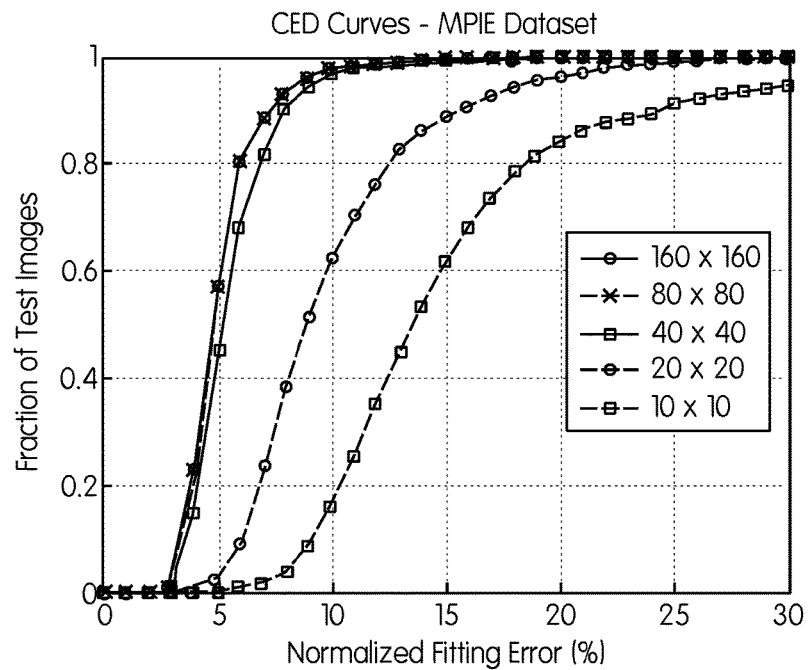
FIGS. 13A-B show data on Cumulative Error Distribution (CED) curves produced by the algorithm of the present invention at various image resolutions.
Figure 13B:
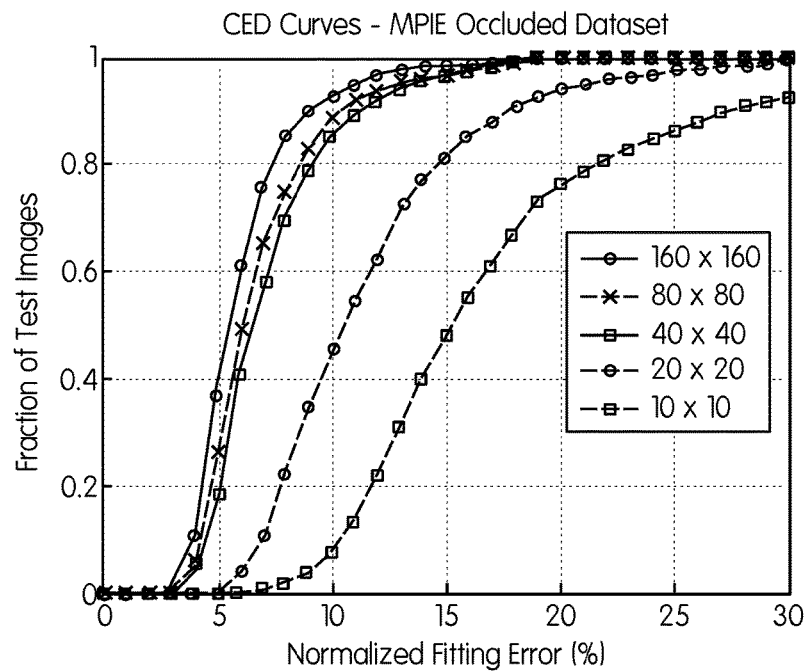
Figure 14A:
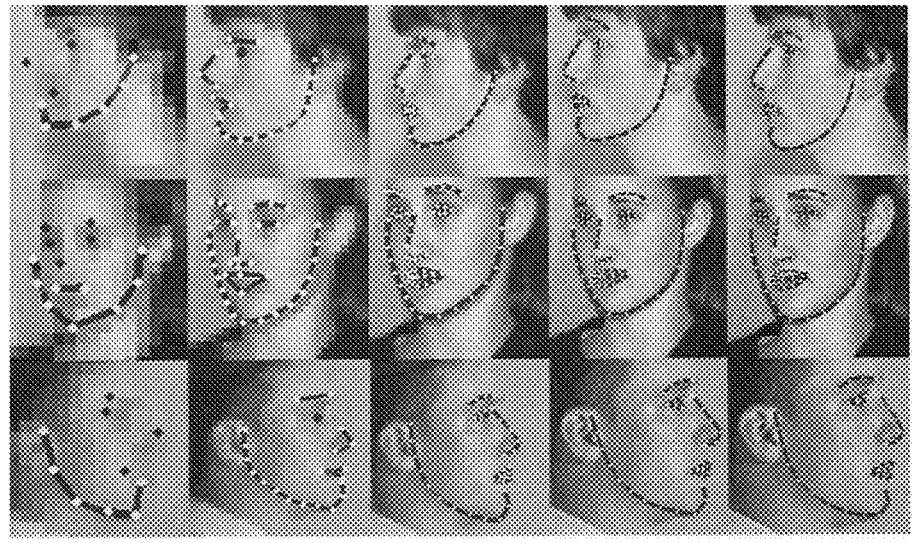
FIGS. 14A-B show qualitative results produced by our approach on some low resolution images.
Figure 14B:
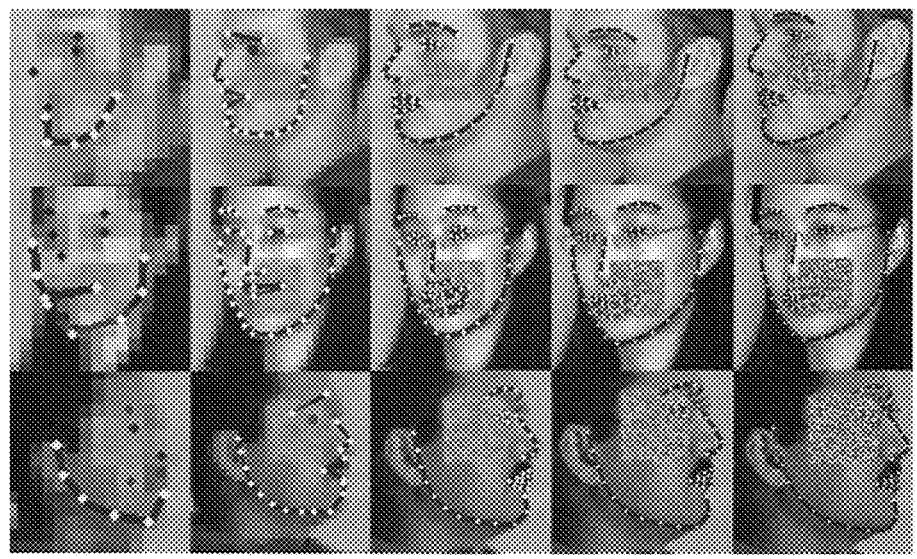
Figure 15:
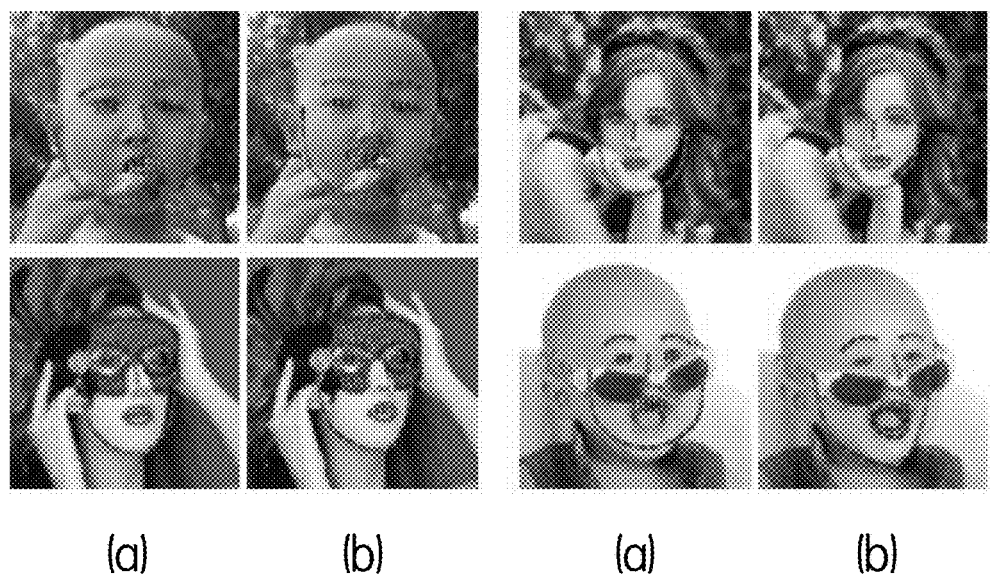
FIG. 15 shows examples from the COFW dataset of where the highest scoring facial shape, shown in columns (a), was not the best fitting shape and could have been replaced with a better fitting facial shape that was not as highly scored, shown in columns (b). In all facial images with landmarks overlaid on them, yellow dots are used to indicate the locations of facial landmarks, blue line segments indicate that the landmark at their center is accurately localized, and red line segments indicate that the landmark at their center is misaligned or potentially occluded.

Testing images were downsampled as well to these resolutions and the appropriate resolution specific model was used to automatically localize the facial landmarks. We did not observe a severe performance degradation for scales of ½ and ¼, however for the remaining two resolution levels, an extremely large fitting error was observed due to pose estimation errors and the final set of landmarks not corresponding to the true pose of the test face. This problem that sometimes affects our algorithm (and indeed any landmarking algorithm that has to simultaneously localize landmarks using the most appropriate pose specific model) is exacerbated in the presence of extremely large levels of occlusion and low resolution. To demonstrate that our approach is actually capable of localizing facial landmarks at these resolutions, provided the facial pose does not have to be jointly estimated, i.e. a rough estimate of facial pose is known, we report fitting error statistics that were computed using the closest of several fitted facial shapes to the ground truth landmarks (rather than using the single highest scoring facial shape) in Table 5. The table lists the Mean Normalized Fitting Error (MNFE) percentages and the standard deviation of the normalized fitting error values over all images (denoted by SD-NFE) with normalization being carried out using the eye center-mouth corner distance (that was used for benchmarking fitting accuracy on these two test datasets in our previous experiment) produced by our approach at the various resolutions on both the test datasets. As expected, there was an increase in these fitting error percentages for the ⅛ and ¹⁄₁₆ scales, especially on the MPIE occluded dataset, which proved to be extremely challenging at these resolutions. The fitting error percentages dramatically increase at these resolutions because the normalization distances involved are extremely small, hence reducing the margin for error. FIGS. 13A-B show CED curves for the various resolutions and datasets and again demonstrates why the extremely low resolution cases pose such a challenge. For the remaining scales, our algorithm's performance was acceptable and not severely impacted. Table 6 summarizes the occlusion prediction performance of our algorithm on the MPIE occluded dataset for the various facial resolutions. Again, performance is severely impacted at the lower resolutions when blurring effects reduce the ability of our local texture classifiers to distinguish the local texture around misaligned/occluded landmarks from that of correctly localized landmarks. Sample qualitative fitting results produced by our approach at the various resolutions are shown in FIGS. 14A-B.

TABLE 4

Details on the parameter values used in our experiment on low resolution image fitting.

| Scale | Image Resolution | Facial Size | Standard Crop Size | Patch Size |
|---|---|---|---|---|
| 1 | 640 × 480 | 160 × 160 | 100 × 100 | 15 × 15 |
| ½ | 320 × 240 | 80 × 80 | 100 × 100 | 15 × 15 |
| ¼ | 160 × 120 | 40 × 40 | 60 × 60 | 9 × 9 |
| ⅛ | 80 × 60 | 20 × 20 | 30 × 30 | 5 × 5 |
| ¹⁄₁₆ | 40 × 30 | 10 × 10 | 15 × 15 | 3 × 3 |

TABLE 5

Performance of our algorithm at various resolutions (facial sizes) on the MPIE and MPIE occluded datasets. MNFE denotes the mean normalized fitting error produced after the average fitting errors over all landmarks were normalized and then averaged over all images. The standard deviation values (SD-NFE) of the normalized fitting error values over all images are also reported.

| | Facial Size | | | | | | | | | |
|---|---|---|---|---|---|---|---|---|---|---|
| | 160 × 160 | | 80 × 80 | | 40 × 40 | | 20 × 20 | | 10 × 10 | |
| Dataset | MNFE (%) | SD-NFE (%) | MNFE (%) | SD-NFE (%) | MNFE (%) | SD-NFE (%) | MNFE (%) | SD-NFE (%) | MNFE (%) | SD-NFE (%) |
| MPIE | 5.22 | 1.96 | 5.26 | 1.99 | 5.69 | 2.12 | 10.23 | 4.88 | 15.91 | 8.75 |
| MPIE occluded | 6.17 | 2.69 | 6.90 | 3.21 | 7.46 | 3.92 | 11.80 | 5.49 | 17.81 | 9.29 |

TABLE 6

Occlusion/misalignment prediction performance of our algorithm on the MPIE occluded dataset at various image resolutions.

| Scale | Facial Size | Accuracy | True Positive Rate (%) | False Positive Rate (%) |
|---|---|---|---|---|
| 1 | 160 × 160 | 86.52 | 76.03 | 11.44 |
| ½ | 80 × 80 | 86.46 | 70.42 | 10.42 |
| ¼ | 40 × 40 | 84.52 | 53.89 | 9.52 |
| ⅛ | 20 × 20 | 77.23 | 52.85 | 19.63 |
| 1/16 | 10 × 10 | 74.39 | 37.27 | 21.05 |

The system can be implemented as software stored on a non-volatile storage medium and executed by a microprocessor. For real-time applications, an image sensor, typically a still or video camera, may be coupled to said microprocessor as a source of images. Alternatively, the system may also be used to process stored images. For purposes of this invention, an image is considered a physical entity that is transformed by the system to another state (i.e., from an image not having landmarks to an image having landmarks).

Although the invention is illustrated and described herein with reference to specific embodiments, the invention is not intended to be limiting to the details shown. Rather, various modifications may be made in the details without departing from the invention.

We claim:

1. A system for automatically localizing a set of facial landmarks on a facial image comprising:
    creating M sets of seed landmarks by placing seed landmarks on the facial image using a plurality of pose-specific local detectors, one pose-specific local detector for each one of M discrete yaw angles;
    aligning each set of seed landmarks with a plurality of pose-specific dense shapes comprising a dense set of landmarks;
    evaluating each dense shape for each of the M sets of seed landmarks to determine the best dense shape for each of the M sets of seed landmarks; and
    refining each of M best dense shapes and ranking the M best dense shapes to determine the single best dense shape containing dense landmarks best aligned with the facial image.

2. The system of claim 1 wherein determining the best dense shape for each of the M sets of seed landmarks comprises utilizing a goodness of fit criteria between each set of seed landmarks and the plurality of dense shapes aligned with that set of seed landmarks.

3. The system of claim 2 wherein each of the dense shapes are evaluated by aligning all combinations of pose-specific seed landmarks taken in pairs with dense landmarks, and selecting the highest scoring dense shape for each pose.

4. The system of claim 3 wherein said dense shapes are scored using classifiers specifically trained for each seed landmark in said pair of seed landmarks.

5. The system of claim 4 wherein said classifiers are trained using a database of shapes with identified seed landmarks.

6. The system of claim 4 wherein said classifiers determine the number of inliers and outliers among said set of dense landmarks, and wherein said score for each shape is a function of the number of inliers and outliers.

7. The system of claim 6 wherein said dense set of landmarks is refined using pose-specific and expression-specific models.

8. The system of claim 6 wherein said best dense shape for each of the M sets of seed landmarks is the dense shape having the highest percentage of inlier landmarks in the set of dense landmarks.

9. The system of claim 3 further comprising cropping and de-rotating said facial image prior to evaluating each dense shape.

10. The system of claim 1: wherein ranking the M best dense shapes comprises calculating
    a probability score for each dense shape indicating the likelihood that said facial image exhibits the pose associated with the dense shape.

11. The system of claim 1 wherein a bounding box of predetermined size has been placed around the facial image.

12. The system of claim 1 wherein each of M sets of seed landmarks is placed on the facial image using a histogram of gradient evaluated in a sliding window in a specific region of said facial image.

13. The system of claim 1 wherein the seed landmarks are selected from a group consisting of the center of the eyes, the tip of the nose, the tip of the chin, the corners of the lips, and two points on the opposite sides of the facial image.

14. The system of claim 1 wherein refining the dense shapes is performed by iteratively scoring locations in a window around each landmark in the dense shape and moving the landmark to the highest scoring location until the landmark converges.

15. The system of claim 14 wherein the dense shapes are regularized between each iteration to generate a dense shape consistent with a typical facial contour.

16. The system of claim 15 wherein only inlier landmarks are used to perform regularization.

17. The system of claim 16 wherein the regularization of landmarks is performed as an $l_1$-regularized least squares problem.

18. The system of claim 15 wherein the regularization of landmarks is performed as an $l_1$-regularized least squares problem.

19. The system of claim 1 further comprising:
    an image sensor; and
    a microprocessor;
    wherein said system is implemented as software executed by said microprocessor.

* * * * *

UNITED STATES PATENT AND TRADEMARK OFFICE
CERTIFICATE OF CORRECTION

| | | |
|---|---|---|
| PATENT NO. | : 10,121,055 B1 | Page 1 of 1 |
| APPLICATION NO. | : 15/259143 | |
| DATED | : November 6, 2018 | |
| INVENTOR(S) | : Marios Savvides et al. | |

It is certified that error appears in the above-identified patent and that said Letters Patent is hereby corrected as shown below:

In the Specification

Column 1, Lines 10-15 In the "GOVERNMENT RIGHTS" section:
"This invention was made, in part, with government support under Grant Number DTFH61-14-C-00006 awarded by Federal Highway Administration's (FHWA) Exploratory Advanced Research Program. The United States government has certain rights in this invention." should read "This invention was made with United States government support under DTFH6114C00006 awarded by the Federal Highway Administration. The U.S. government has certain rights in the invention."

Signed and Sealed this
Third Day of December, 2024

Katherine Kelly Vidal
*Director of the United States Patent and Trademark Office*